United States Patent [19]

Fulton

[11] Patent Number: 5,149,338
[45] Date of Patent: Sep. 22, 1992

[54] SUPERPOLISHING AGENT, PROCESS FOR POLISHING HARD CERAMIC MATERIALS, AND POLISHED HARD CERAMICS

[76] Inventor: Kenneth W. Fulton, 6 Adams Rd., Hubbardston, Mass. 01452

[21] Appl. No.: 733,306

[22] Filed: Jul. 22, 1991

[51] Int. Cl.$^5$ .............................................. B24D 17/00
[52] U.S. Cl. ................................... 51/293; 51/308; 51/309; 106/3; 106/6
[58] Field of Search .......... 51/293, 308, 309; 106/3, 6, 10

[56] References Cited

U.S. PATENT DOCUMENTS

| | | | |
|---|---|---|---|
| 4,225,349 | 9/1980 | Koshiyama et al. | 106/3 |
| 4,242,842 | 1/1981 | Yancey | 51/309 |
| 4,270,932 | 6/1981 | Perovetz et al. | 51/293 |
| 4,935,039 | 6/1990 | Miyazaki | 51/293 |
| 4,952,240 | 8/1990 | Smith | 106/3 |
| 5,000,761 | 3/1991 | Mayton et al. | 51/293 |

Primary Examiner—William R. Dixon, Jr.
Assistant Examiner—Willie J. Thompson
Attorney, Agent, or Firm—Nields & Lemack

[57] ABSTRACT

A process for superpolishing hard ceramic substrates, and super polished substrates having surface finishes below about 20 angstroms RMS. The process comprises applying a pitch to a lap tool and forming channels in the pitch. The pitch is wetted with a polishing compound comprising colloidal alumina and powder of a substance harder than that being polished. The substrate is brought into contact with the wetted pitch, and a relative motion is applied thereto to polish the substrate.

12 Claims, 1 Drawing Sheet

SUPERPOLISHING AGENT, PROCESS FOR POLISHING HARD CERAMIC MATERIALS, AND POLISHED HARD CERAMICS

BACKGROUND OF THE INVENTION

Beryllium has many properties that make it desirable for use in severe environments. Such properties include low density, good thermal conductivity, good infrared reflectivity, high stiffness, low coefficient of thermal expansion at cryogenic temperatures, and small nuclear cross section. However, the high toxicity of beryllium powders has minimized its use. In addition, superpolished beryllium surfaces tend to lose their low scatter quality due to oxidation. Beryllium also has a relatively high porosity, which can result in deleterious voids and etches forming on the finished product.

As a result of the foregoing drawbacks, when high strength silicon carbide (SiC) has been used in lieu of beryllium, it has demonstrated considerable advantages and much success in severe environment applications. It exhibits excellent oxidation and creep resistance, and is believed to outperform beryllium in many if not all applications. For many applications including hard disk drive, super conductor wafer applications and high-reflective optics, superpolished surfaces are required.

Conventional polishing techniques are capable of producing a polished surface having a surface roughness on the order of about 100 Å RMS (random measurement sampling). However, decreased surface roughness has obvious advantages depending on the application. For example, in computer hard disk drive applications, surface roughness less than 10 Å RMS would allow substantially more information per disk area. Similarly, in laser application, a 10 Å RMS mirror surface would allow for more efficient operation by creating higher laser reflectivity (therefore lower laser absorption), thus lessening the possibility of mirror burns.

Accordingly, there exists a need for producing hard ceramic materials having superpolished surfaces with a surface roughness below about 20 Å RMS, and indeed, as low as about 0.5 Å RMS even with substrate diameters of 10–12 inches or larger.

SUMMARY OF THE INVENTION

The problems of the prior art have been solved by the present invention, which provides a novel superpolishing agent, a process for superpolishing hard ceramic materials, and the resulting superpolished hard ceramic materials having surface roughnesses below about 20 Å RMS. The present invention is especially applicable to the polishing of silicon carbide, CVD-coated (carbide vapor deposit) silicon carbide, or pure CVD silicon carbide. The low angstrom finish can be achieved even with wafers having diameters as large as about 10 to 12 inches or larger. Substrates having shapes ranging from flat to aspheric can be polished.

DETAILED DESCRIPTION OF THE INVENTION

Figure 1:
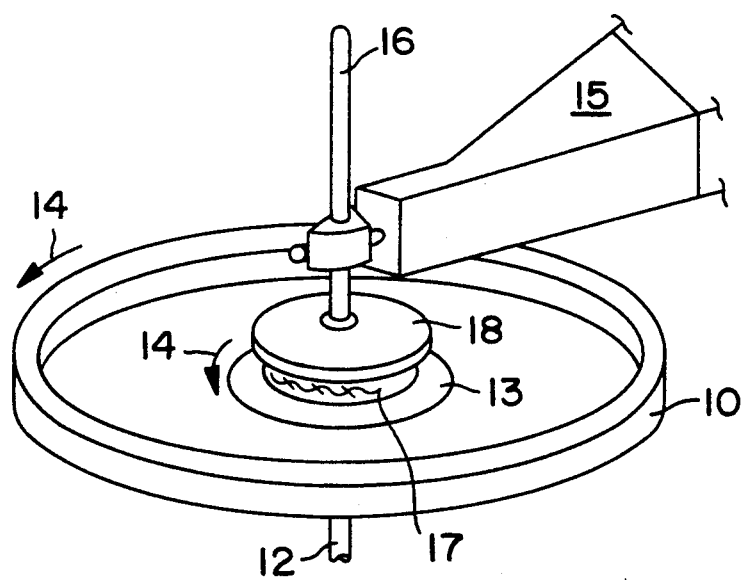

In accordance with the present invention, there is provided a polishing compound capable of providing hard ceramic materials with fine surface finishes when used in accordance with the present process. The polishing agent includes a dispersion of oxides of alumina in water, the alumina having particle diameters of 0.05 microns and the dispersion having a pH of about 4. The polishing agent is available commercially from Nyacol Products, Inc. of Massachusetts. Alternatively, the polishing agent that can be used is a colloidal alumina polishing compound available commercially from Solutions Technology as "200 Å Ultra Sol Colloidal Alumina Compound". The polishing agent is then combined with deionized or distilled water and a powder of a substance that is harder than the substrate being polished to form the polishing compound. The alumina in the polishing compound reduces friction during polishing, and the colloidal alumina compound helps to keep the powder in suspension. Suitable powders include diamond powder, imitation diamond powder such as zirconium powder, and a boron carbide powder such as NORBIDE, available from The Norton Company. The powders may be used alone or in combination. Preferably the powder is diamond powder. Where diamond powder is used, the diamond powder particles combined with the polishing compound should have a size range of from about greater than zero to about 15 microns, depending on the final surface roughness desired. Where fine polishing is desired, preferably the size of the powder particles is between about 0.25 and about 10 microns, most preferably about 3 microns or less. Where a rougher finish is acceptable, the size of the powder particles can be about 10 to about 15 microns. The boron carbide powder particle size can be from about 800 microns to about 1500 microns, preferably about 1200 microns to about 1500 microns, again depending upon the desired finish.

The powder and water are combined with the polishing agent by any suitable means, such as mixing. A slurry of the powder in the polish is formed. The amount of powder added to the polishing agent depends in part on the speed at which the polishing process is to be accomplished. The more powder added, the faster the process. However, economics limit the amount of powder to be added. Preferably, about ⅛ carat of diamond powder is added to about 8 ounces of equal parts of polishing agent and water. Those skilled in the art can determine the appropriate amount of powder to be added without undue experimentation, depending upon the application and desired polished finish.

Since the viscosity of the polishing agent is relatively high, it must be diluted with water. Preferably about 1 part of water is added per 1 part of polishing agent. If too much water is added, the effect of the powder on polishing is deteriorated. If not enough water is added, the polishing agent will dry too quickly during the polishing, and the powder won't be suspended in the solution as well.

Conventional polishing apparatus can be used in carrying out the process according to the present invention. Such apparatus includes the Precision Polishmaster 12 inch work capacity model 6 DE, sold commercially by R. Howard Strasbaugh, Inc. Other suitable apparatus is partially illustrated in FIG. 1. There it is shown that well 10 is formed in which is housed a vertical machine spindle 12. A polishing tool 13 which can have various sizes depending upon the size of the wafer to be polished has an aperture (not shown) which is adapted to affix to the spindle 12. The spindle is connected to drive means to impart thereto rotary motion in the direction of the arrow 14. Arm 15 has a pin 16 which fits into a holder and blocking tool 18, which in turn holds the substrate 17 to be polished. The arm 15 is connected to drive means to impart horizontal motion thereto.

Since the materials being polished in accordance with the present invention are hard ceramics including silicon carbide, CVD-coated (carbide vapor deposit) silicon carbide, or pure CVD silicon carbide TM, a hard polishing lap material should be used. Preferably, the lap material is a petroleum pitch and is a combination of wax and resin. Suitable pitches include CYCAD black pitch (hard grade) and GUGOLZ pitch. The preferred pitch is "CYCAD CLEARGOLD Optical Polishing Pitch" available commercially from Cycad Products. The lap material is heated in a suitable container until it is in liquid form. The liquid pitch is then applied to the polishing tool (typically an aluminum plate) to a suitable thickness, such as ¼ inch. The pitch can be so applied by any suitable means, such as by dipping, brushing, or pouring it onto the tool. Preferably a dam is formed around the tool by tape or other suitable means, to confine the pitch on the tool until the pitch cools and hardens. The pitch is allowed to cool in the desired configuration, which corresponds to the configuration of the substrate to be polished. For example, where the substrate to be polished is concave, the pitch is applied so that when hardened, it forms a convex shape into which the concave substrate conforms. Suitably shaped pressing laps can be used for this purpose. Once cooled, small channels or grooves are cut into the pitch which will allow the polishing agent, and in particular, the powder in the polishing agent, to penetrate the channels. This also helps the polishing agent to flow to keep the lap wet. The channels can be any configuration which allows adequate penetration. The inventor of the present invention has found that a criss-cross or grid pattern is appropriate. Preferably the channels are cut to a depth of about ½ inch, and are of a width slightly greater than that of a conventional razor blade. If the depth of the channels is too great, the powder in the polishing agent will not be near the surface of the pitch, and the polishing will be inefficient. Preferably the outside perimeter of the pitch which is outside the stroke of the substrate being polished is stress relieved by scarring. In particular, the inventor of the present invention has found that the outside perimeter tends to chip during polishing unless the same is sress relieved. The scarring can be accomplished by holding a razor blade along this outside perimeter of the pitch, and turning the machine on to cause rotation of the lap.

The polishing compound prepared as disclosed above is applied to the polishing lap with a brush. Sufficient compound is applied so that the channels formed in the lap are penetrated and the lap is wet. During the polishing, additional polishing compound can be brushed on the lap as needed. If a dam is formed and maintained on the lap, the necessity to continually add polishing compound can be reduced or eliminated. However, in such an embodiment it is preferable that the polishing compound be stirred on the lap. A brush can be attached to the polishing apparatus for this purpose.

The substrate is affixed to the blocking tool preferably with wax. Specifically, a small layer of wax is applied to the blocking tool and heated so that it becomes sticky. The surface of the substrate that is not being polished is then brought into contact with the wax, and the wax is allowed to harden. If necessary, the substrate itself may be heated in addition to or in lieu of heating the wax. The blocking tool and substrate are then suspended by the holding pin 16, and the substrate is brought into contact with the lap. Weights may be added substantially directly over the substrate and/or to the arm 15 to decrease the time needed to polish the substrate to the desired finish.

The machine is turned on, thus beginning the actual polishing process. The lap is rotated, and the substrate is moved back-and-forth across the lap by the arm 15. The stroke of the arm can be adjusted during the operation, depending upon the progress of the polishing. For example, if a more convex curve is desired, this can be accomplished by adjusting the stroke to sweep over each side of the substrate. Alternatively, if a more concave curve is desired, the stroke is adjusted to make shorter sweeps across the substrate, thus concentrating more pressure in the center. The polishing is continued until the desired surface finish is achieved. The surface roughness can be measured with a laser interferometric microscope, such as a Zygo high performance, noncontact, surface profiler, and compared to Bureau of Standards test plates.

By using the process in accordance with the present invention, a superpolished product can be obtained having a surface roughness below about 20 Å RMS, and indeed as low as about 0.5 Å RMS. Although the present invention is not to be limited thereby, it is believed that the low angstrom finish that can be achieved with the method of the present invention is a result of the combination of the polishing compound, the pitch, and the polishing technique used. The polishing compound causes the substrate being polished to glide across the surface of the lap while simultaneously softening the top layer of the lap. Consequently, the powder imbedded in the channels formed in the pitch polishes the substrate. As the polishing process continues, the powder breaks down into even finer particles, thus creating a finer polishing finish on the substrate.

The following example will serve to illustrate the various embodiments of the present invention.

EXAMPLE 1

Preparation of Pitch

A can of CYCLAD CLEARGOLD Optical Polishing Pitch is heated until the contents are in liquid form. A dam approximately ½ inch high is formed around an aluminum polishing tool with conventional masking tape. The pitch is poured onto the tool to a thickness of about ¼ inch. A pressing lap is used to shape the pitch, and the pitch is allowed to harden at room temperature. Once hardened, channels are cut into the pitch with a razor blade in a criss-cross pattern. Since the area of the pitch is larger in this case than that of the substrate to be polished, the circumference of the pitch which will fall outside the stroke of the substrate is scarred to prevent chipping of the pitch during polishing. The dam is maintained on the lap.

Preparation of Polishing Compound

About four ounces of 200 Å Ultra Sol Colloidal Alumina Compound is poured into a container. After adding about four ounces of deionized water, about ½ a carat 3 micron diameter diamond powder is added, and the resulting solution is stirred with a brush.

Polishing Procedure

A layer of wax is applied to a blocking tool having a backing plate. The wax is heated, a 3-inch diameter CVD silicon carbide wafer is pressed onto the tool, and the wax is allowed to cool, thereby adhering the wafer to the tool.

The polishing compound is brushed onto the lap, and the substrate is brought into contact with the lap. The machine arm is lowered so that its pin sits in an aperture in the backing plate of the blocking tool. The machine is turned on, causing rotation of the lap and a horizontal stroke of the substrate. A five pound weight is placed on the blocking tool, and a second five pound weight is placed on the machine arm. A brush is secured to the machine in such a manner so that it is in contact with the lap but does not interfere with the substrate. The brush continuously mixes the polishing compound on the lap.

Additional polishing compound may be added. The polishing compound added can have powders of different particle dimensions, depending upon the degree of polishing desired.

The polishing is continued until the desired finish is achieved.

What is claimed is:

1. A process for polishing hard ceramic materials to a surface roughness below about 20 angstroms RMS, comprising:
   a. forming a layer of petroleum pitch on a polishing tool;
   b. forming channels in said pitch;
   c. wetting said pitch with a polishing compound comprising colloidal alumina and a powder of a substance that is harder than the substrate to be polished; and
   d. contacting said substrate to be polished with said wetted pitch and imparting relative motion to said substrate.

2. The process of claim 1 wherein said powder is selected from the group consisting of diamond, boron carbide and imitation diamond powder.

3. The process of claim 2 wherein the powder is diamond powder having particles of diamond that average about 3 microns in diameter.

4. The process of claim 1 wherein said substrate comprises silicon carbide.

5. The process of claim 1 wherein said substrate comprises CVD coated silicon carbide.

6. The process of claim 1 wherein said relative motion is imparted by spinning said polishing tool and by moving said substrate horizontally across the spinning tool.

7. The process of claim 1 wherein said substrate is polished to a surface roughness less than about 10 angstroms RMS.

8. The process of claim 1 wherein said substrate is polished to a surface roughness of about 2 angstroms RMS.

9. The process of claim 1 wherein said substrate is polished to a surface roughness of about 0.5 angstroms RMS.

10. The process of claim 1 wherein said layer of pitch is formed on said polishing tool by forming a dam on said polishing tool; heating said pitch to a liquid state; and applying said pitch to said tool while said pitch is in the liquid state, said dam confining the liquid pitch to said tool.

11. The process of claim 1 wherein said polishing compound is continuously agitated during polishing.

12. The hard ceramic substrate of claim 1 wherein said substrate comprises a material selected from the group consisting of silicon carbide, CVD-coated silicon carbide, and pure CVD silicon carbide.

* * * * *

UNITED STATES PATENT AND TRADEMARK OFFICE
CERTIFICATE OF CORRECTION

PATENT NO. : 5,149,338

DATED : September 22, 1992

INVENTOR(S) : Kenneth W. Fulton

It is certified that error appears in the above-identified patent and that said Letters Patent is hereby corrected as shown below:

Column 1, line 54, delete "deposit" and substitute therefor --deposition--.

Signed and Sealed this

Nineteenth Day of July, 1994

Attest:

BRUCE LEHMAN

Attesting Officer      Commissioner of Patents and Trademarks